United States Patent
Edwards et al.

(10) Patent No.: US 10,482,678 B1
(45) Date of Patent: Nov. 19, 2019

(54) SYSTEMS AND METHODS FOR DISPLAYING VIDEO FROM A REMOTE BEACON DEVICE

(71) Applicant: Capital One Services, LLC, McLean, VA (US)

(72) Inventors: Joshua Edwards, Philadelphia, PA (US); Michael Mossoba, Arlington, VA (US); Abdelkader M'Hamed Benkreira, Washington, DC (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/221,100

(22) Filed: Dec. 14, 2018

(51) Int. Cl.
| | |
|---|---|
| *G06T 19/00* | (2011.01) |
| *G06F 3/0346* | (2013.01) |
| *H04N 7/18* | (2006.01) |
| *G06F 1/16* | (2006.01) |
| *H04N 21/4402* | (2011.01) |

(52) U.S. Cl.
CPC .......... *G06T 19/006* (2013.01); *G06F 1/1694* (2013.01); *G06F 3/0346* (2013.01); *H04N 7/183* (2013.01); *H04N 21/440263* (2013.01)

(58) Field of Classification Search
CPC ............... G06F 3/0346; G06F 1/1694; H04N 21/440263; H04N 7/183; G06T 19/006
See application file for complete search history.

(56) References Cited

U.S. PATENT DOCUMENTS

| | | | |
|---|---|---|---|
| 9,686,481 B1* | 6/2017 | Graybill | H04N 5/32 |
| 2009/0244097 A1* | 10/2009 | Estevez | G06F 1/1613 |
| | | | 345/633 |
| 2011/0164116 A1 | 7/2011 | Gay et al. | |
| 2011/0287811 A1* | 11/2011 | Mattila | G06K 9/4671 |
| | | | 455/566 |
| 2014/0043433 A1* | 2/2014 | Scavezze | G06T 19/006 |
| | | | 348/42 |
| 2014/0146038 A1* | 5/2014 | Kangas | G06T 19/006 |
| | | | 345/419 |
| 2015/0062123 A1* | 3/2015 | Yuen | G06T 19/006 |
| | | | 345/420 |
| 2015/0070347 A1 | 3/2015 | Hofmann et al. | |
| 2015/0186559 A1* | 7/2015 | Schmidt | G06F 17/5004 |
| | | | 345/419 |
| 2015/0378520 A1* | 12/2015 | Chandrasekaran | G06F 3/0482 |
| | | | 715/716 |
| 2016/0314624 A1* | 10/2016 | Li | G06F 1/163 |
| 2017/0026788 A1* | 1/2017 | Kostka | H04W 4/21 |

\* cited by examiner

*Primary Examiner* — David Tung
(74) *Attorney, Agent, or Firm* — DLA Piper LLP (US)

(57) ABSTRACT

A method for displaying video on a user device may include detecting a beacon, determining a location of the user device, detecting a first orientation of the user device by one or more first motion accelerometers, detecting a second orientation of the user device by one or more second motion accelerometers, receiving beacon location information, comparing at least one of the first orientation and the second orientation to the beacon location information, based on the comparing at least one of the first orientation and the second orientation to the beacon location information, creating a connection to the camera, requesting video from the camera by the user device, receiving the video captured by the camera, displaying a first window on a display of the user device, and displaying the video captured by the camera on the display of the user device.

20 Claims, 10 Drawing Sheets

US 10,482,678 B1

SYSTEMS AND METHODS FOR DISPLAYING VIDEO FROM A REMOTE BEACON DEVICE

TECHNICAL FIELD

The present disclosure relates generally to methods and systems for presenting video on the display of a user device.

BACKGROUND

Improvements in consumer technology have resulted in the emergence of technologies, such as augmented reality. Generally, augmented reality provides an interactive experience in a real-world environment. Objects situated in the real-world environment may be "augmented" by computer technology, for example a camera application running on a smartphone. Augmentation may occur by overlaying sensory information, including visual, auditory, and haptic information, on a user interface of a device. An example of augmented reality technology used in technology devices such as smart phones is the application Pokémon Go®. In Pokémon Go, a user may hold a smartphone device in a real-world location and environment, and software on the smartphone may cause the display to show Pokémon as an overlay on the display, as if the Pokémon existed in the real-world environment. It is possible to augment a display of a consumer device to display other things as well, for example other programming constructs like text, images, or video.

Security cameras are devices that may be used to capture video for purposes of deterring crime or, alternatively, enabling the capture of individuals who commit a crime and are identified on video captured by security cameras. Access to the video stream captured by a security camera may be provided through a wired or a wireless connection. For example, a security guard, sitting in a secure environment with access to a computer connected to a remote security camera through a wired connection, may be able to view the stream captured by the remote security camera on the computer, and monitor the stream for suspicious activity.

As another example, a homeowner can setup a camera with a viewpoint of a front entrance, setup a wireless network, and connect the camera to the wireless network. Once setup, the homeowner may be able to access the video stream captured by the camera via one or more networks, including wireless network, and may do so remotely, for example if the user is at work and receives an alert on an application installed on a smartphone device.

SUMMARY OF THE DISCLOSURE

Systems and methods described herein may provide for displaying video from a remote beacon device.

For example, a method for displaying video on a user device may include detecting a beacon, determining a location of the user device, detecting a first orientation of the user device by one or more first motion accelerometers, detecting a second orientation of the user device by one or more second motion accelerometers, receiving beacon location information, comparing at least one of the first orientation and the second orientation to the beacon location information, based on the comparing at least one of the first orientation and the second orientation to the beacon location information, creating a connection to the camera, requesting video from the camera by the user device, the video captured by the camera, receiving the video captured by the camera, displaying a first window on a display of the user device, and displaying the video captured by the camera on the display of the user device.

In some embodiments, the processing may further include detecting a third orientation of the user device by the one or more first motion accelerometers, detecting a fourth orientation of the user device by the one or more second motion accelerometers, comparing at least one of the third orientation and the fourth orientation to the beacon location information, based on the comparing at least one of the third orientation and the fourth orientation to the beacon location information, terminating the connection to the camera, and closing the displayed second window.

In some embodiments, the processing may further include receiving, by the user device, user input, the user input indicating a user preference, and based on the user input, changing the dimensions of the second window.

In some embodiments, changing the dimensions of the second window includes expanding the size of the second window.

In some embodiments, the processing may further include, prior to displaying the second window on the display of the user device, analyzing, by the user device, the video from the camera to identify one or more objects present in the video, associating at least one of the one or more identified objects present in the video with beacon location information, determining a resolution size of the at least one of the one or more identified objects present in the video, and defining the size of the second window based on the resolution size of the at least one of the one or more identified objects present in the video.

In some embodiments, the processing may further include requesting a security code by the user device, and transmitting the security code to the camera.

In some embodiments, the processing may further include determining an updated location of the user device, comparing the updated location to the location of the beacon, and based on comparing the updated location to the location of the beacon, terminating the connection to the camera.

As another example, a user device may be configured to display video and include a processor, a display in communication with the processor, a first motion accelerometer in communication with the processor, a second motion accelerometer in communication with the processor, a wireless transceiver in communication with the processor, and a non-transitory memory storing instructions that, when executed by the processor, cause the processor to perform processing including detect a beacon, the beacon in proximity with the user device, determine a location of the user device, receive direction information from the first motion accelerometer, receive position information from the second motion accelerometer, detect a first orientation of the user device, detect a second orientation of the user device, receive beacon location information, compare at least one of the first orientation and the second orientation to the beacon location information, based on the comparison of at least one of the first orientation and the second orientation to the beacon location information, create a connection to the beacon, request video from the beacon by the user device, receive the video from the beacon, display a first window on a display of the user device, and display a second window on the display of the user device.

In some embodiments, the processing may further include detect a third orientation of the user device by the one or more first motion accelerometers, detect a fourth orientation of the user device by the one or more second motion accelerometers, compare at least one of the third orientation and the fourth orientation to the location of the beacon, based on the comparison of at least one of the third orientation and the fourth orientation to the beacon location information, terminate the connection to the beacon, and close the displayed second window.

In some embodiments, the processing may further include receive user input, and based on the user input, change the dimensions of the second window.

In some embodiments, the processing to change the dimensions of the second window may further include expanding the size of the second window.

In some embodiments, the processing may further include, prior to displaying the second window on the display of the user device, analyzing, by the user device, the video from the camera to identify one or more objects present in the video, associating at least one of the one or more identified objects present in the video with beacon location information, determining a resolution size of the at least one of the one or more identified objects present in the video, and defining the size of the second window based on the resolution size of the at least one of the one or more identified objects present in the video.

In some embodiments, the processing may further include display a user interface, receive security code information, and transmit the security code information.

In some embodiments, the processing may further include determine an updated location of the user device, compare the updated location to the location of the beacon, and based on the comparison of the updated location to the location of the beacon, terminate the connection to the camera.

As another example, a method for displaying video on a user device placed on a user's head may include detecting a beacon, detecting, by a sensor, the presence of the user's head in proximity to the user device, detecting an orientation of the user device by one or more motion accelerometers, receiving beacon location information, comparing the orientation to the beacon location information, detecting an updated orientation of the user device by the one or more motion accelerometers, comparing the updated orientation to the beacon location information, based on the comparing the updated orientation to the beacon location information, creating a connection to the camera, requesting video from the camera by the user device, receiving the video captured by the camera, and displaying the video captured by the camera on a display of the user device.

In some embodiments, the processing may further include detecting a second updated orientation of the user device by the one or more motion accelerometers, comparing the second updated orientation to the beacon location information, based on the comparing the second updated orientation to the beacon location information, terminating the connection to the camera, and closing the displayed window.

In some embodiments, the processing may further include receiving, by the user device, user input, and based on the user input, changing the dimensions of the window.

In some embodiments, changing the dimensions of the window may include expanding the size of the window.

In some embodiments, the processing may further include, prior to displaying the window on the display of the user device, analyzing, by the user device, the video from the camera to identify one or more objects present in the video, associating at least one of the one or more identified objects present in the video with beacon location information, determining a resolution size of the at least one of the one or more identified objects present in the video, and defining the size of the window based on the resolution size of the at least one of the one or more identified objects present in the video.

In some embodiments, the processing may further include requesting a security code by the user device, and transmitting the security code to the camera.

DETAILED DESCRIPTION OF SEVERAL EMBODIMENTS

Figure 1:
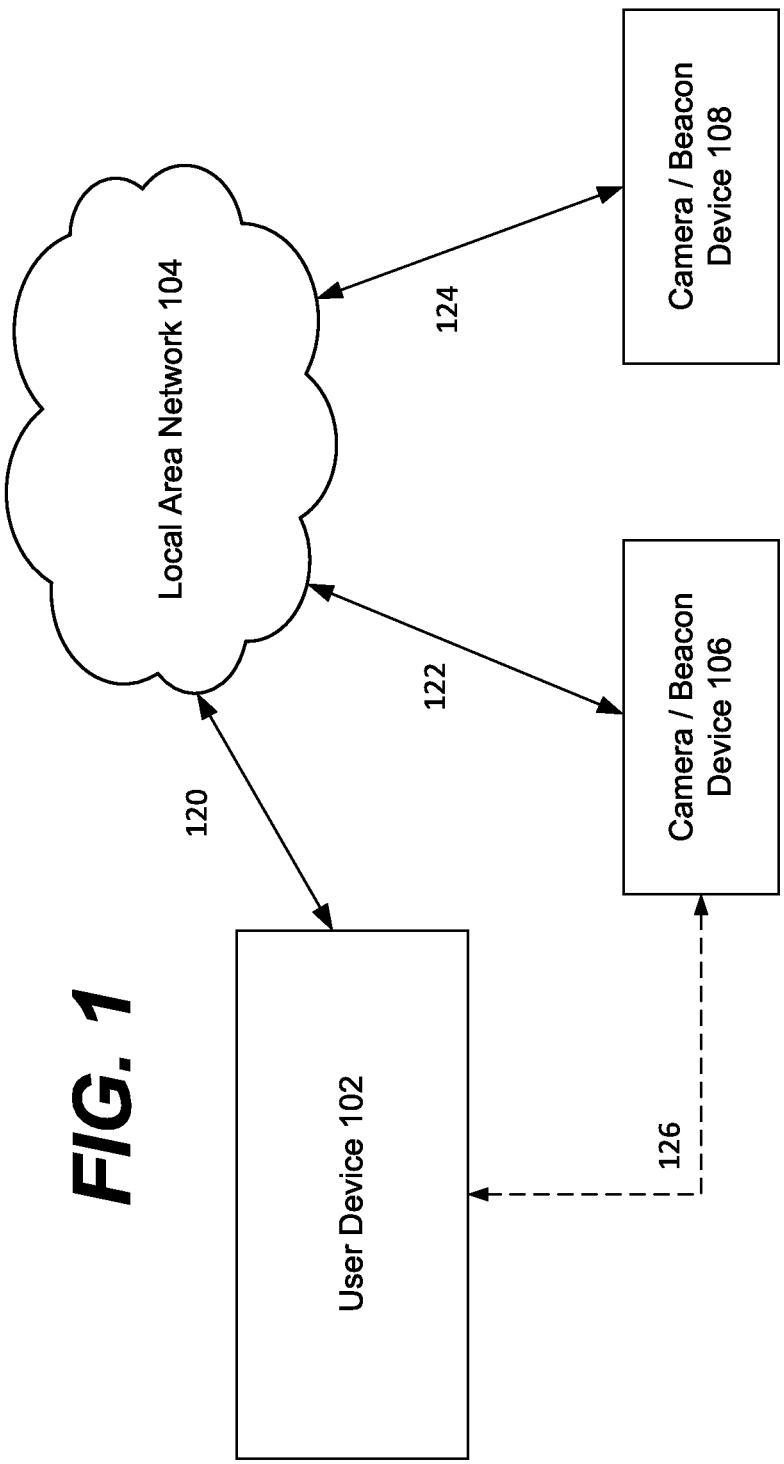
FIG. 1 shows a block diagram structure with one or more user device and one or more beacon devices according to an embodiment of the present disclosure.

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

The present disclosure relates generally to methods and systems for displaying video, captured by a beacon device, on another user device, such as a smartphone or smart glasses, if the user device is directed towards the beacon device. A beacon device is generally configured to capture video, and may be located in any environment that a user desires, for example an alleyway next to a home or apartment, or in the interior of a safe, for example a vault storing valuable or dangerous goods that a user desired to protect from being stolen or improperly used.

The beacon device may capture and record video, and may be generally accessible by one or more devices over a network, for example a local area network or the Internet. When a user device is in proximity to the beacon device, the user device may establish communication with the beacon device in order to access the video captured by the beacon device. The mere presence of the user device to the beacon device may be insufficient to cause the screen of the user device to display the video captured by the beacon device. In some embodiments, the user device must be pointed or directed in the direction of the beacon device. Software logic in the user device may then determine, based on the orientation of the phone and the location of the beacon device, that the user device is pointed or directed towards the beacon device. Based on this determination, the user device may go through a process resulting in a video stream being displayed in a user interface element of the display of the user device, where the video stream includes video captured by the beacon device. In such a manner, a user may be able to access a video stream despite obstacles being in the way of the user and the beacon device.

For example, if the user places a beacon device in a safe, and configures the beacon device in a manner consistent with the present disclosure, the user may point or direct a user device at the safe (so that the safe appears on the screen of a user device, or the safe is in the field of vision of the user when the user device is a wearable device). After determining that the user device is pointed at the safe, the user device may display a video stream being captured by the beacon device on the screen of the user device. The video stream may display the contents of the safe, for example a passport, money, and other valuables or dangerous items. Thus, the user is able to determine the status of the contents of the safe by pointing their device in the direction of the beacon. As discussed in the present disclosure, other embodiments and use cases are possible and within the scope of the present disclosure.

An exemplary environment for establishing communications between a user device and a beacon device is shown in FIG. 1. FIG. 1 shows a user device 102, one or more beacon devices, including beacon device 106 and beacon device 108, and a local area network 104.

User device 102 may be a smartphone, tablet, laptop computer, desktop computer, smart glasses, or other device configured to connect to a network and display information in a display including a user interface. User device 102 can access one or more beacon devices through a network. For example, user device 102 may send user data and user requests to beacon device 106 or beacon device 108 through a network, for example local area network 104, the Internet, a public network, a private network, or a combination of networks. An exemplary structure of user device 102 is provided in more detail below.

While the network shown in FIG. 1 shows user device 102 in communication with either of beacon device 106 and beacon device 108 through local area network 104, other configurations and communication paths are possible.

Beacon device 106 may be a camera, recorder, or other device configured to capture images or video. Beacon device 106 may also be configured to connect to one or more user devices, for example user device 102.

The devices shown in FIG. 1 may communicate through local area network 104. For example, user device 102 may establish a connection 120 with local area network 104, beacon device 106 may establish a connection 122 with local area network 104, and beacon device 108 may establish a connection 124 with local area network 104. In some embodiments, communication between devices, for example communications between user device 102 and beacon device 106, may occur through local area network 104 and any devices associated with local area network 104, for example a wireless router or a wireless modem. Connections between user device 102, beacon device 106, and beacon device 108 with local area network 104 may be wireless, or may alternatively be wired connections.

In some embodiments, user device 102 may communicate with a beacon device, for example beacon device 106, through a direct connection, for example connection 126. While it is possible for communications between user device 102 and beacon device 106 to travel through a wired connection, in preferred embodiments the communications will travel through a wireless connection.

User device 102 may include a memory interface, one or more data processors, image processors, and/or central processing units (CPU), and a peripherals interface. Memory interface, one or more processors, and/or peripherals interface may be separate components or may be integrated circuits. The various components in user device 102 may be coupled by one or more communication buses or signal lines.

Sensors, devices, and systems may be coupled to the peripherals interface to facilitate multiple functionalities. For example, one or more accelerometers, a barometer, a gyroscope, a light sensor, a magnetometer, a barometer, and a proximity sensor may be coupled to the peripherals interface to facilitate orientation, lighting, and proximity functions. Other sensors may also be connected to the peripherals interface as needed, such as a global navigation satellite system (GNSS) (e.g., GPS receiver), a biometric sensor, or other sensing device.

A camera system and an optical sensor, for example a charged coupled device (CCD) or a complementary metal-oxide semiconductor (CMOS) optical sensor, may be utilized to facilitate camera functions, such as recording images and video. The camera system and optical sensor may also be used to collect images of a user environment, for example the interior and/or exterior of a vehicle, a home, an office, or a social event, including objects located within such environments. One or more applications may be installed on user device 102 that can take advantage of the camera system and optical sensor.

Communications to and from user device 102 may be facilitated through one or more wired and/or wireless communication systems, which can include radio frequency (RF) transceivers, transmitters, and receivers. For example, Bluetooth (e.g., Bluetooth low energy (BLE)) and/or Wi-Fi communications described herein may be handled by wireless communication systems. The design and implementation of communication systems may depend on the communication network(s) over which user device 102 is intended to operate. For example, user device 102 may include communication systems designed to operate over a GSM network, a GPRS network, an EDGE network, a Wi-Fi or WiMAX network, and a Bluetooth network. Wireless communication systems may include hosting protocols such that user device 102 can be configured as a base station for other wireless devices and/or to provide a Wi-Fi service.

User device 102 may include an audio system, where audio system may include a speaker and a microphone for facilitating voice-enabled functions, such as speaker recognition, voice replication, digital recording, and telephony functions. Audio system may be configured to facilitate processing voice commands and voice authentication, for example.

User device 102 may include an input/output (I/O) system. I/O system may include a touch-surface controller and other input controllers. Touch-surface controller may be coupled to a touch surface of user device 102. The touch surface and touch-surface controller may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface. Other input controllers may be coupled to other input/control devices, such as one or more buttons, rocker switches, mouse wheel, infrared port, USB port, and a pointer device, such as a stylus. The one or more buttons (not shown) may include a button for volume control of the speaker or the microphone.

A memory interface may be coupled to memory in user device 102. Memory may include high-speed random access memory (RAM) and/or non-volatile memory, such as one or more magnetic disk storage devices, one or more optical storage devices, and flash memory (e.g., NAND, NOR). Memory may store one or more operating systems, such as Darwin, RTXC, LINUX, UNIX, OS X, WINDOWS, an embedded operating system such as VxWorks, or mobile operating systems, such as Android or iOS (for example when user device 102 is a mobile phone, tablet, or other device running operating system software designed for mobile applications).

Operating system installed on user device 102 may include instructions for handling basic system services and for performing hardware dependent tasks. In some embodiments, the operating system may be a kernel (e.g., UNIX kernel). In some embodiments, the operating system may include instructions for performing voice authentication.

A beacon device, for example beacon device 106 or beacon device 108, may include similar structure as user device 102. For example, a beacon device may include memory, a memory interface, one or more data processors, image processors, and/or central processing units (CPU), a peripherals interface, sensors, and other systems (e.g., a camera system, I/O system, wireless communication systems, and audio system). For purposes of the present disclosure, a beacon device is capable of capturing and transmitting images or video of an environment. A beacon device may connect to one or more user devices, and in other embodiments, a beacon device may make an image or video stream available over a network for one or more user devices. Further, a beacon device is generally fixed, such that its location is relatively known. The location of the beacon device can be transmitted to an access point of a local area network, and in other embodiments the beacon device may transmit its location to user device 102. User device 102 may use the location information provided by beacon device to determine whether user device is pointed in the direction of beacon device.

Figure 2:
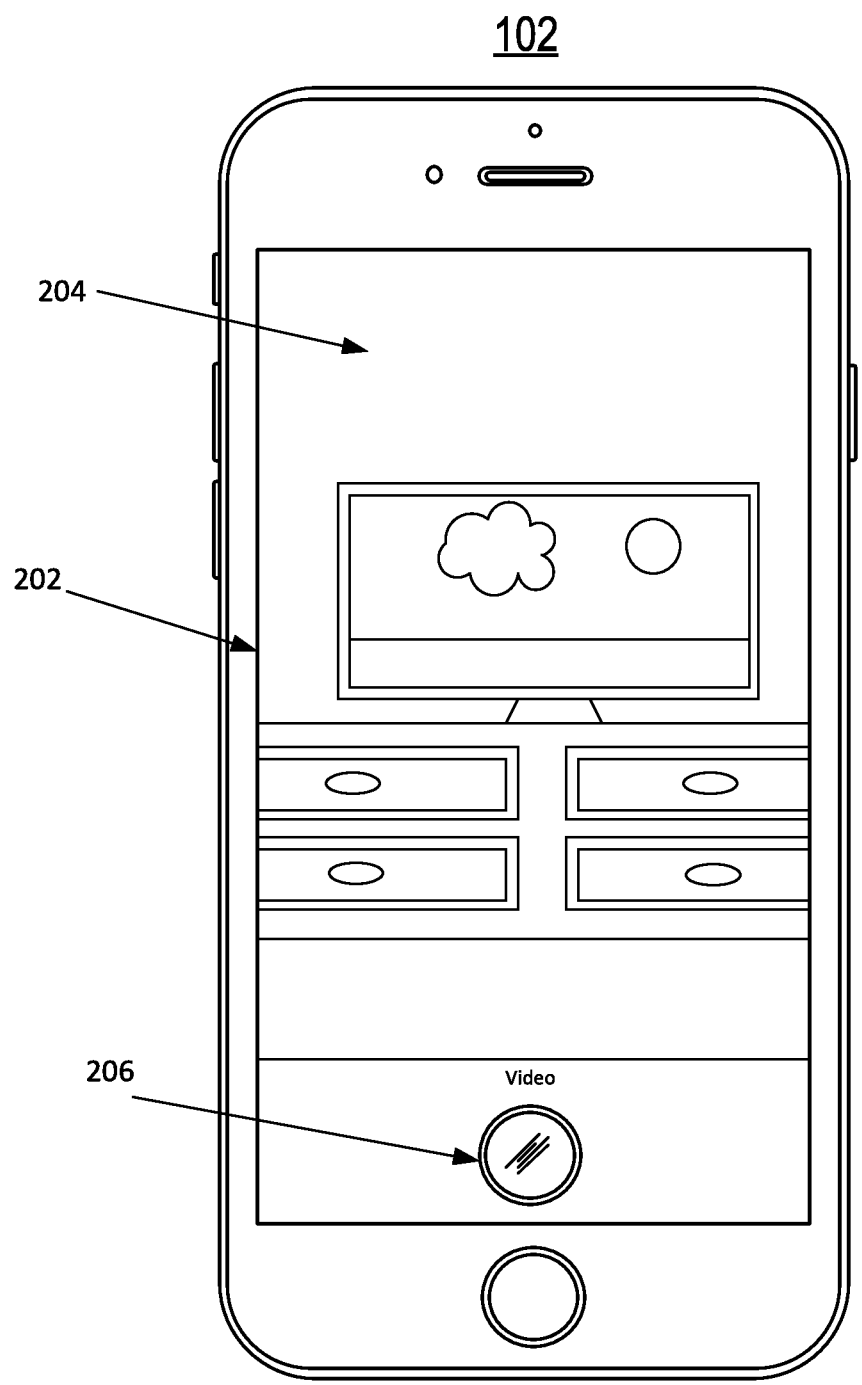
FIG. 2 shows a user interface of a user device according to an embodiment of the present disclosure.

Referring to FIG. 2, FIG. 2 shows a user interface of a user device, for example user device 102, when user device 102 is a smartphone device. In FIG. 2, user interface 202 shows an image or video of an environment 204 as captured by user device 102. In some embodiments, including the embodiment shown in FIG. 2, user interface 202 may include a button 206 for capturing images or video. In some embodiments, user device 102 includes one or more applications, for example a camera application, for capturing images or video of an environment, for example, environment 204.

Figure 3:
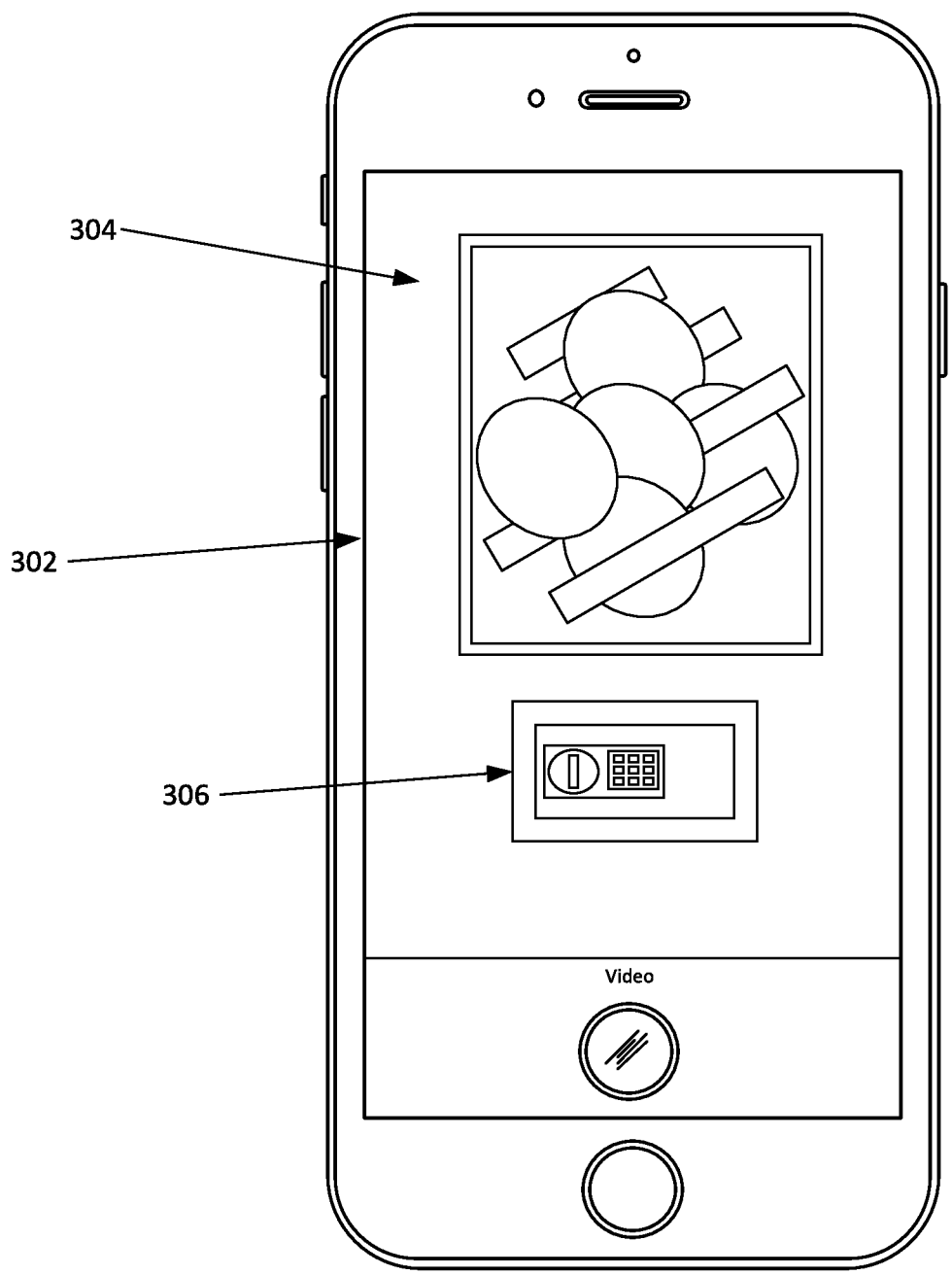
FIG. 3 shows a user interface of a user device according to an embodiment of the present disclosure.

FIG. 3 shows a user interface of a user device, for example user device 102, when user device 102 is a smartphone device. In FIG. 3, user interface 302 shows an image or video of an environment 304 as captured by user device 102. As shown in FIGS. 2 and 3, the environment captured by a camera application on a user device, for example user device 102, may change, depending on when the camera application on the user device is used by a user of the user device. FIG. 3 also shows a safe 306. For purposes of FIG. 3, safe 306 does not include a beacon device, though user device 102 is pointed or directed in the location of safe 306, such that safe 306 is visible in user interface 302.

Figure 4:
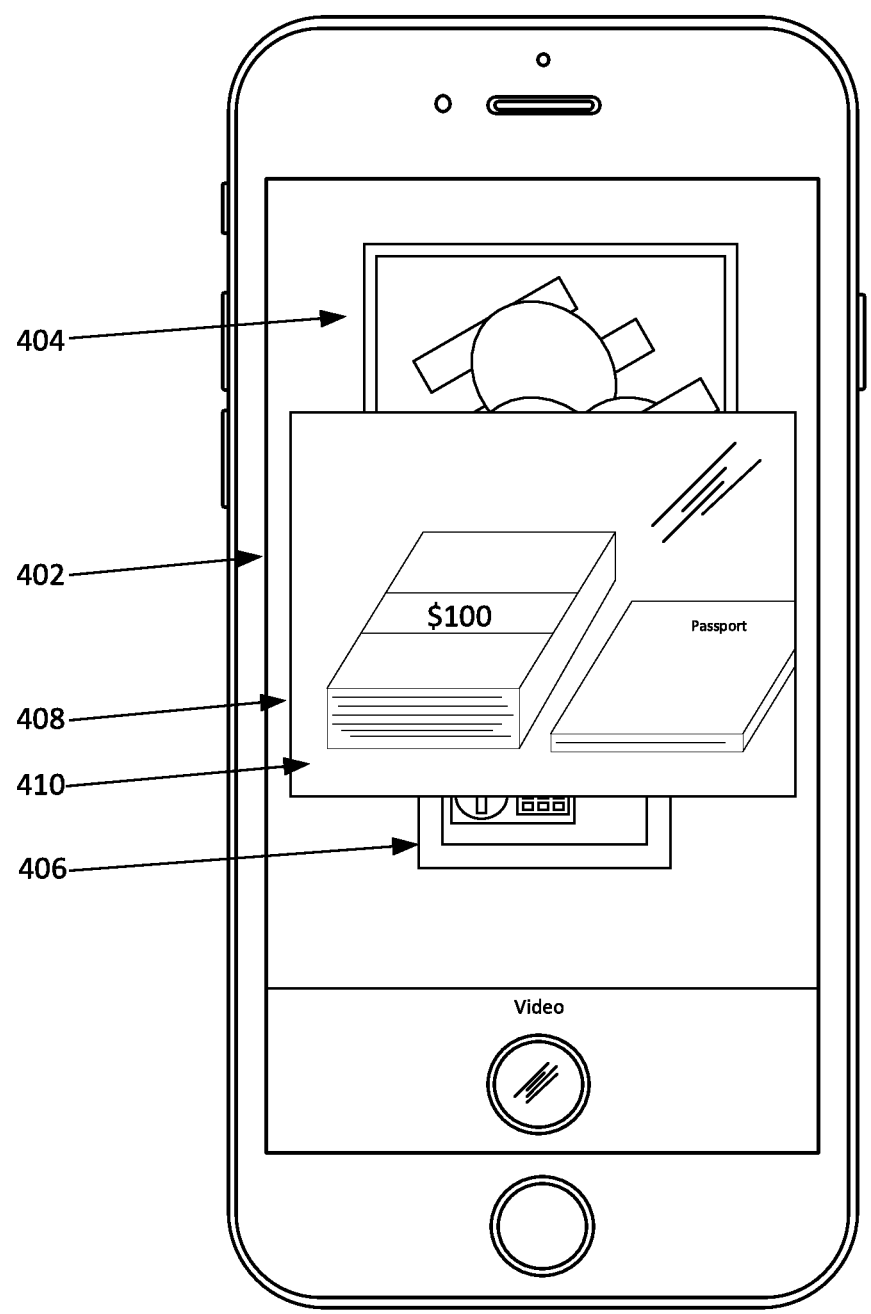
FIG. 4 shows a user interface of a user device according to an embodiment of the present disclosure.

Referring to FIG. 4, FIG. 4 shows a user interface of a user device, for example user device 102, when user device 102 is a smartphone device. In FIG. 4, user interface 402 shows an image or video of an environment 404 as captured by user device 102. In some embodiments, user interface 402 displays when a user is using a camera application on user device 102. Also shown in user interface 402 is safe 406, which may be the same as safe 306 shown in FIG. 3. In contrast with FIG. 3, safe 406 in FIG. 4 includes a beacon device (not shown).

User interface 402 also shows an overlay user interface 408, where overlay user interface 408 shows an environment 410. In some embodiments, overlay user interface 408 is a user interface window that appears on top of user interface 402. Overlay user interface 408 shows an image or video captured by a beacon device, for example a beacon device in safe 406 (not shown).

In some embodiments, overlay user interface 408 may display when user device 102 is pointed or directed towards beacon device (not shown). As described above, beacon device may include structure for capturing images and video. For example, in FIG. 4, the beacon device has been placed in an upper corner of safe 406, such that it may capture an image or video of the contents of safe 406. As shown, the beacon device captures an image or video of objects stored in the safe, for example cash money and a passport. In some embodiments, the contents of safe 406 may be shown in overlay user interface 408. In this manner, the user is able to identify a user interface associated with environment 404 (e.g., the location where the user is located) and a user interface associated with environment 410 (e.g., the inner parts of safe 406). Overlay user interface 408 is shown in the center of user interface 402, but in other embodiments, overlay user interface 408 may be shown in a corner of user interface 402, and in other embodiments may be shown in a user interface window with different proportions. For example, overlay user interface 408 may be shown in a smaller resolution for mobile devices, and may be shown in a larger resolution for tablet devices and desktop or laptop computers. In some embodiments, the user may have the option to present the image or video captured by the beacon device in a user interface window that can be maximized to display on the entirety of user interface 402.

Referring back to FIG. 3, when a user points or directs user device 102 towards safe 306, no overlay user interface 408 appears on user interface 304. Safe 306 does not contain a beacon device, and there is otherwise no beacon device in the field of vision of user device 102.

In contrast, referring now to FIG. 4, when a user points or directs user device 102 towards safe 406 containing a beacon device, overlay user interface 408 is displayed. In some embodiments, user device 102 may establish a connection with a beacon (not shown) when one or more of user device 102 and beacon device determine that user device 102 is pointed or directed towards beacon device. Based on this determination, beacon device may transmit video to user device 102, such that video captured by beacon device may be displayed on the display of user device 102. A connection may be established prior to determining that user device 102 is pointed or directed towards beacon device, and in other embodiments the connection may be established in response to determining that user device 102 is pointed or directed towards beacon device. The logic for determining when user device 102 is pointed or directed at beacon device is described in further detail below.

Figure 5:
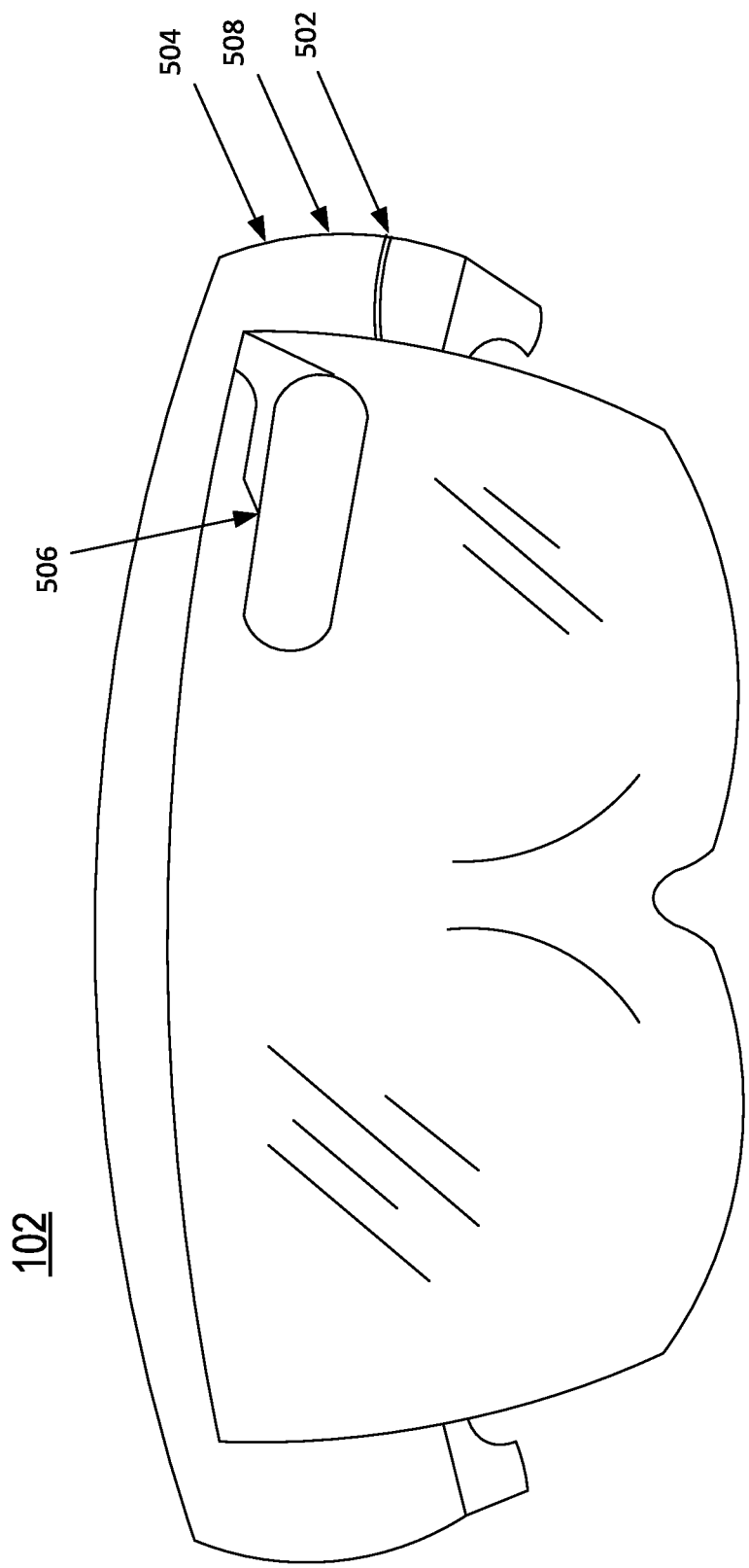
FIG. 5 shows a user device for presenting video in augmented reality according to an embodiment of the present disclosure.

FIG. 5 shows an alternative embodiment of a user device 500 that may be used to view images or video captured by a beacon device. FIG. 5 shows glasses that have been modified to include for example transceiver 502, processing unit 504, display 506, and memory 508. The components identified above are exemplary, and user device 500 may include other components. Further, while user device 500 is shown as smart glasses, user device 500 may also be other devices capable of being worn on a user's head, for example a headset or other device capable of displaying images to a user.

Transceiver 502 may be used to provide communications between user device 500 and a beacon device. Alternatively, transceiver 502 may be used to provide communications to a data source containing access to a stream provided by a beacon device. The data source may be located on a local area network, such that the stream may be provided to the user device without having to travel over a network, or the data source may be located on a remote network, for example the Internet.

Processing unit 504 may be used to process data received from transceiver 502, send data to be transmitted by transceiver 502, and processing capabilities for displaying images or video captured by for example a beacon device. Display 506 may be used to present an image to the user. FIG. 5 shows a single display (for the right eye), and in some embodiments, user device 500 may include multiple displays, including at least one display for each eye. User device 500 may also include a memory 508. Memory 508 may include RAM or non-volatile memory, such as memory described in the present disclosure. Memory 508 may be used for various applications, including buffering video and storing information for displaying objects on a user interface.

The present disclosure shows that a user device 102, when pointed or directed towards a beacon device, may be capable of presenting image or video captured by the beacon device in a user interface window provided on the display of user device 102.

For embodiments where user device 102 is a smartphone, one or more accelerometers, gyroscope, and other sensors may be used to determine the orientation of user device 102. For example, such sensors may be used to determine the direction in which user device 102 is pointed or directed, and based on such determination, cause images captured by the beacon to be displayed on a smartphone. In other embodiments, the smartphone may contain an app including image recognition capabilities. The image recognition capabilities may include the ability to identify objects within an image(s) captured by a smartphone camera, and based on the objects identified and determining whether such objects are associated with a beacon device, cause images capture by the beacon to be displayed on the smartphone based on, in part, identifying a specific object in the image(s). In some embodiments, an object may be associated with a beacon device without necessarily being associated with a location or viewing direction of the beacon device. For example, upon object recognition of an associated object, using computer image analysis techniques, image(s) or video captured by the associated beacon device may be presented in a user interface window provided on the display of user device 102.

For some user devices, the direction orientation of user device may not be sufficient to cause such user devices to display images or video captured from a beacon device. For example, if user device is a smartphone, the smartphone may be pointed or directed towards a beacon device, but the user may be playing a game or accessing information through an application installed on the smartphone, such that the smartphone is pointed downwards. In some embodiments, even though such a user device is pointed in the direction of beacon device, images or video captured by beacon device are not transmitted to or received by such user devices. For user devices where y-axis orientation may be relevant, user device 102 may include additional accelerometers, gyroscopes, and other sensors for determining a vertical or position orientation of user device 102. In some embodiments, sensors included in user device 102 may be used for determining both a direction orientation (e.g., x-axis orientation) and a position orientation (e.g., y-axis orientation), and in other embodiments, user device 102 includes sensors that separately handle direction and position orientation determinations of user device 102.

In other embodiments, for example where user device 102 is a pair of smart glasses, user device 102 may include sensors to determine the direction that the device is pointed or directed towards, but may not include sensors for determining the orientation on a y-axis. Accordingly, accelerometers, gyroscopes, and other sensors that may be used to determine orientation, for example orientation in a vertical axis (e.g., the y-axis) may be omitted from embodiments including a pair of smart glasses.

User device 102 and beacon device may communicate through short-range wireless technologies, for example near-field communications (NFC) and Bluetooth. In some embodiments, user device 102 communicates with a router or device configured to control access to a network, for example a local area network (LAN), to determine whether user device 102 is pointed or directed at a beacon device. User device 102 may also obtain images or video captured by beacon device from an access point to LAN, rather than communicating directly with beacon device for purposes of transmitting images or video from beacon device to user device 102.

Figure 6A:
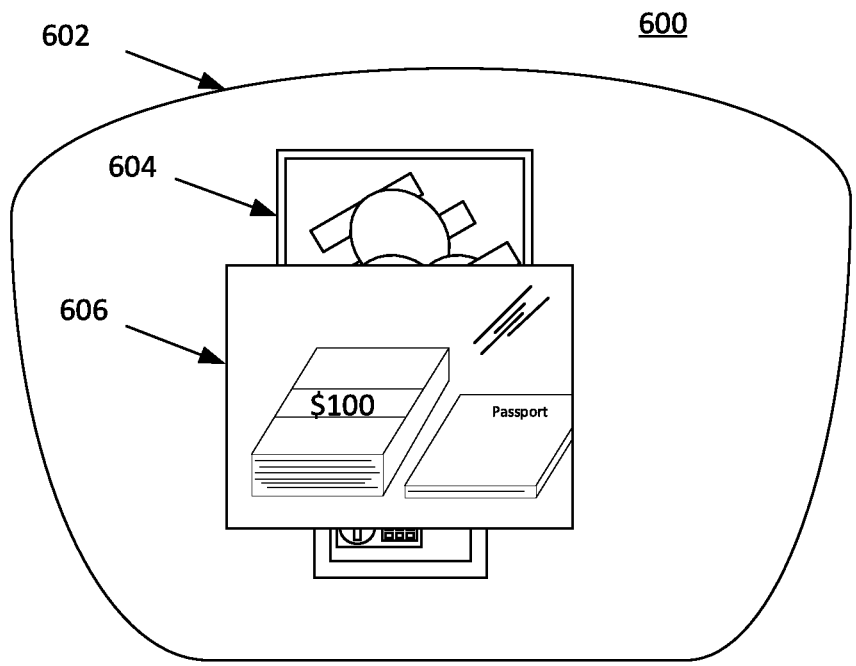
FIG. 6A shows a user interface of the user device according to an embodiment of the present disclosure.
Figure 6B:
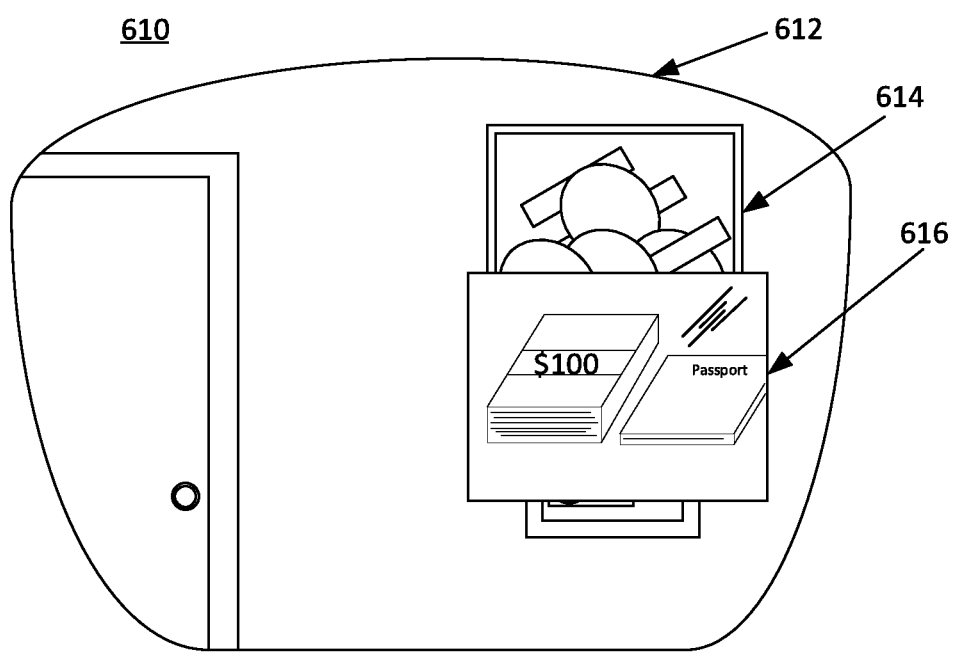
FIG. 6B shows a user interface of the user device according to an embodiment of the present disclosure.

Referring now to FIGS. 6A and 6B, those figures show a user interface for user device 500, while user device 500 is being worn by a user. FIG. 6A specifically shows an environment displayed via user device 102. For embodiments where user device 102 is a pair of smart glasses, for example, the user may view the environment shown in FIG. 6A through the right lens of smart glasses, such as the smart glasses shown in FIG. 5. FIG. 6A shows the lens boundary 602, an environment 604, and an overlay user interface 606. Overlay user interface 606 may be caused to be displayed by display 506, and may display images or video captured by a beacon device stored in a safe (shown partially towards the bottom of FIG. 6A). The combination of environment and user interface shown in FIG. 6A may be similar to the combination of environment and user interface shown in FIG. 4, except that the type of user device for viewing is different.

FIG. 6B shows an environment and an overlay user interface according to an embodiment of the present disclosure. FIG. 6B shows a user device 610 that includes lens boundary 612, environment 614, and overlay user interface 616. In FIG. 6, the overlay user interface 616 is shown towards the right-side of lens boundary 612. This may occur when, for example, a user is looking in the general direction of a beacon device, but is not looking directly at the beacon device. In some embodiments, overlay user interface 616 may not be displayed unless it is determined that user device 102 is directed towards beacon device with a reasonable degree of error (e.g., for avoiding display of overlay user interface when a user does not desire to access images or video captured by beacon device).

Figure 6C:
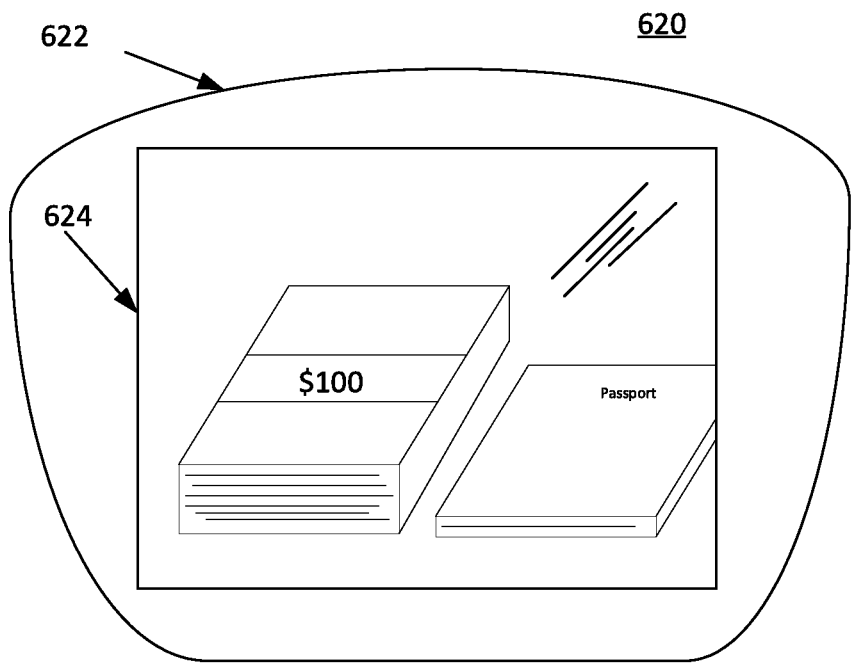
FIG. 6C shows a user interface of the user device according to an embodiment of the present disclosure.
Figure 6D:
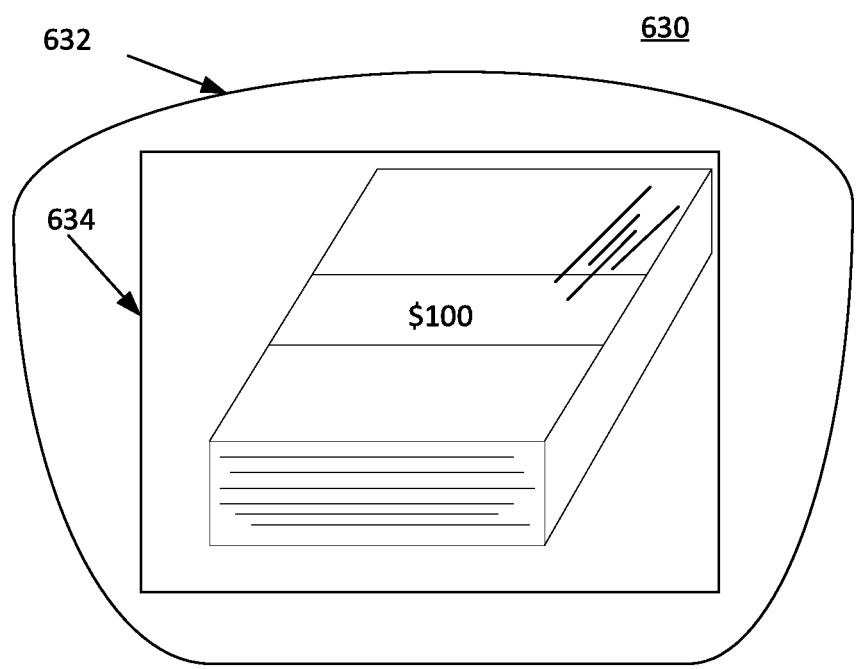
FIG. 6D shows a user interface of the user device according to an embodiment of the present disclosure.

FIGS. 6C and 6D show environments and overlay user interfaces according to an embodiment of the present disclosure. FIG. 6C shows a user device 620 with a lens boundary 622 and an overlay user interface 624. As shown, overlay user interface 624 is displayed in a manner such that it includes a majority of the space shown in lens boundary 622. In other embodiments, overlay user interface 624 may be displayed in a smaller or larger resolution. FIG. 6D shows a user device 630 with a lens boundary 632 and an overlay user interface 634. As shown, the contents of the images or video captured by beacon device are enlarged, as compared to for example the contents of the images or video captured by beacon device as shown in overlay user interface 624 from FIG. 6C.

In some embodiments, the user may perform gestures for manipulating a displayed stream of images or video. For example, if the user holds a hand in a position approximately behind overlay user interface 634, and starting in a position with the user's index and thumb and slowly moving the index and thumb apart, user device 102 may determine a gesture, in this example a zoom gesture. In response to detecting the zoom gesture, user device 102 may manipulate the stream of images or video to zoom-in. For example, as shown in FIG. 6D, while viewing the contents of a safe including money and a passport, if the user performs a zoom-in gesture over the money, user device 102 may cause the stream of images or video to enhance and focus on the money, such that other objects originally in view of overlay user interface 634 are no longer displayed. Other gestures are possible, for example a zoom-out gesture (e.g., moving an index finger and thumb closer together from a start position where the index finger and thumb are apart) and a tap gesture (e.g., quickly moving an index finger in a forward direction several times).

Gesture detection may be performed by using a camera system included as part of user device 102 to capture images or video in the direction orientation and/or position orientation of a user device, such as user device 102. In addition to the components and systems described above, user device 102 may include a gesture detection unit for determining a gesture based on images or video captured from a camera system included in user device 102. The gesture detection unit may include software instructions for gesture detection and for object recognition. For example, using the contents of FIG. 6C, a gesture detection unit may analyze images or video captured from beacon device, including images or video shown in overlay user interface 624. Gesture detection unit may detect two objects, money and passport. Further, when a user performs a gesture in view of camera system, gesture detection unit may include logic for determining the relative location of objects performing the gesture and compare the relative locations to the relative locations of objects shown in images or video captured from beacon device. In such a manner, if the user were to perform a zoom-in gesture over the displayed money, the gesture detection unit may determine the user's intent, and user device 102 may include logic for manipulating the images or video to zoom-in on the money, as shown in FIG. 6D.

Alternative methods may be used to determine whether a video stream captured by a beacon device should be displayed on a user device. For example, an application on a user device may be pre-configured to recognize certain objects within a field of vision, for example a wall painting or a safe as shown in FIG. 3. When a user holding a user device (or alternatively, while wearing a user device) points the device at the pre-configured object, a camera system associated with user device may capture video of the environment, including the pre-configured object, perform an image analysis to identify objects within the video, and compare identified objects to pre-configured objects.

If there is a match (e.g., an object identified in a video stream appears to adequately match a pre-configured object), then user device 102 may proceed to obtain and display a video stream captured by beacon device in a manner consistent with the present disclosure. As a precaution, before requesting a video stream captured by beacon device, user device 102 may perform a proximity check to ensure that user device 102 is in a proximate location compared to beacon device. If the proximity check fails, then it is possible that there was a false match (e.g., the object captured by the video is not the pre-configured object because the user device 102 is not in a proximate location to beacon device). If the proximity check passes, then user device 102 may proceed to display a video stream captured by beacon device.

For example, if the safe 406 shown in FIG. 4 is pre-configured in an application on user device 102, and if a user holds user device 102 to capture an environment shown in FIG. 4, logic on user device 102 may perform an image analysis to determine objects within the field of vision, including wall painting and safe 406. Once an object is identified from the video captured by user device 102, the object is compared to one or more pre-configured objects. Upon determining a match between an object captured by user device 102 and a pre-configured object (e.g., safe 406), user device 102 may proceed to request access to video captured by beacon device, as the user device is aware of a beacon device because of the pre-configured object.

Different methods of determining how and when to display images captured by a beacon on a display of a user device are disclosed. In some embodiments, the user device may perform both device orientation techniques (e.g., determine whether the user device is pointed in the x-axis direction and/or y-axis direction of a beacon device) and image recognition techniques (e.g., determine whether an object in an image captured by a device camera is identified and associated with a beacon device). The device orientation technique may be performed before image recognition techniques, and vice versa. In other embodiments, only device orientation techniques, or only image recognition techniques may be performed in determining whether images captured by a beacon device may be displayed on a smartphone display. For example, if the user device does not contain adequate sensors to reliably determine the x-axis orientation and/or the y-axis orientation of the user device, the user device may use, as a default, image recognition techniques for causing images captured by a beacon device to be displayed on the user device display.

In some embodiments, user device 102 may create an overlay user interface that is based on a default size, or alternatively based on a user preference that is defined prior to using user device in a manner as disclosed in the present disclosure.

In other embodiments, user device 102 may instead create an overlay user interface with a size that is defined based on an object that is either identified in the video stream or that may be associated with a beacon device. For example, user device 102 may analyze a video stream to identify objects in the video stream, as described in the present disclosure, and match defined objects with pre-configured objects. When creating an overlay user interface, user device 102 may define the size of newly created overlay user interface to correspond to an estimated size of the object identified in the video stream captured by the beacon device. As such, the user may be able to view other objects in the user's environment, without the overlay user interface obstructing the user's view of such objects.

The present disclosure is not limited to a single video stream. For example, subject to bandwidth limitations of user device 102, user device 102 may present multiple overlay user interfaces showing multiple video streams from two or more beacon devices. Such a situation may occur for example if multiple beacon devices have been setup, and the user holds (or wears) user device in a directional orientation consistent with both beacon devices. In some embodiments, user device 102 may determine that one of the beacons is in the field of vision of user device 102 before determining that the other beacon is in the field of vision of user device 102, and cause an overlay user interface to display that shows a video stream associated with the first beacon device (i.e., the beacon that first came into view of user device's display when being held up or worn by a user).

The size of overlay user interface shown on a display of user device 102 may be static in some embodiments, and dynamic in other embodiments. For example, if a user, while holding a user device 102 that is a smartphone, decides to move closer to a beacon device while the user device 102 includes an overlay user interface showing a video stream captured by the beacon device, the size of overlay user interface may increase in size. Likewise, if a user, while holding a user device 102 that is a smartphone, decides to move away from a beacon device while the user device 102 includes an overlay user interface showing a video stream captured by the beacon device, the size of overlay user interface may decrease in size.

Figure 7:
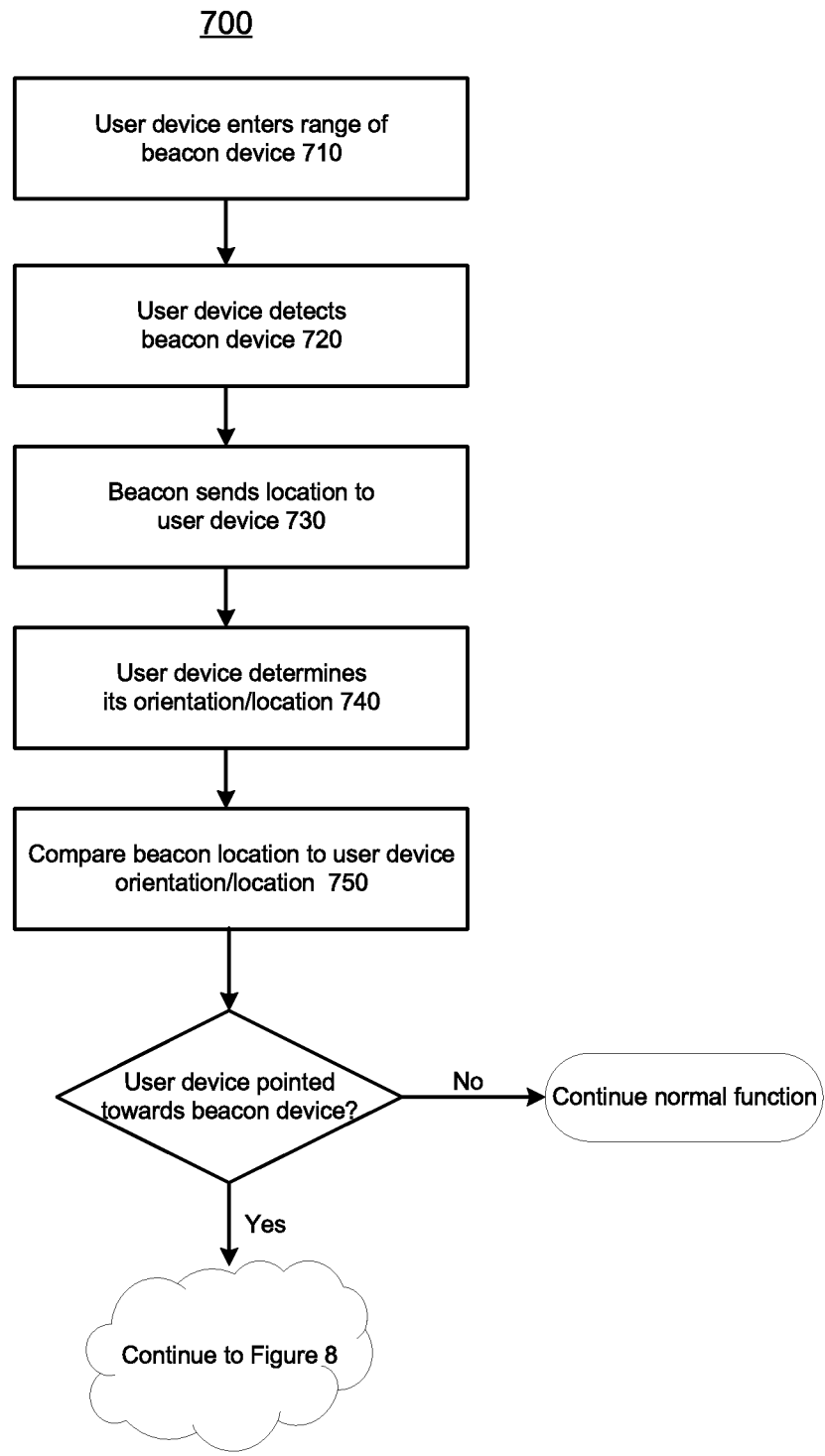
FIG. 7 shows a method for communications between a user device and a beacon device for presenting video in augmented reality according to an embodiment of the present disclosure.

FIG. 7 shows a method for displaying images or video captured by a beacon device on a display of a user device. Beginning with step 710, a user of a user device, for example user device 102, enters into range of a beacon device.

At step 720, the user device detects beacon device. In some embodiments, user device may detect beacon device through one or more short-range wireless technologies, such as Bluetooth or NFC. In other embodiments, user device may detect beacon device through an access point to a network, for example a local area network. In the context of FIG. 7, in response to detecting beacon device, user device may transmit a request for beacon device's location. While not shown, user device may alternatively use algorithms, for example a signal comparison algorithm, to detect the relative location, including direction and distance, of a beacon.

At step 730, beacon device sends its location to user device. Beacon device may send its location in response to a request from user device, or in other embodiments beacon device may broadcast its location to all devices in range of the beacon device's broadcast signal. When user device is in range of beacon device, user device may receive a broadcast signal from beacon device.

At step 740, user device determines its orientation. For example, user device may determine its direction orientation (e.g., x-axis orientation) using one or more sensors, for example accelerometers, and may determine its position orientation (e.g., y-axis orientation) using one or more sensors. In some embodiments, for example where user device is a pair of smart glasses, user device may only determine its direction orientation.

At step 750, user device compares its orientation to the beacon device's location. Beacon device's location may include GPS coordinates, or may include approximate coordinates. In some embodiments, user device may compare its direction orientation to beacon device's location, and presuming the direction orientation is towards beacon device's location within a reasonable degree of error, user device may confirm that it is pointed towards beacon device.

For user devices that determine position orientation (e.g., a smartphone or tablet), user device may determine its position orientation to determine if user device is pointed towards the ground, is approximately perpendicular to the ground (e.g., if the user is holding the user device upright), or if user device is pointed upwards (e.g., it has an opposite orientation to an orientation associated with pointed towards the ground). In some embodiments, user device may determine that its position orientation is a match (e.g., user device is held upright, or alternatively user device is pointed upwards). The position orientation can vary, and user device may determine that position orientation is a match when, for example, the user device's position orientation is less than 20 degrees, 10 degrees, 5 degrees, etc. from an upright position.

Figure 8:
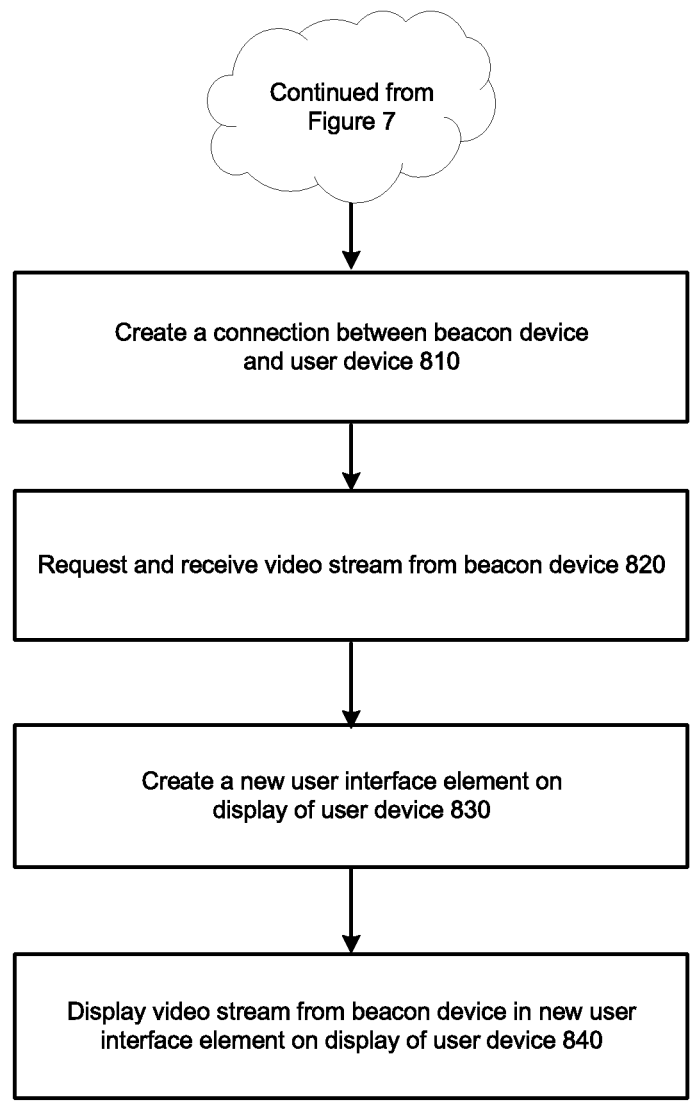
FIG. 8 shows a method for communications between a user device and a beacon device for presenting video in augmented reality according to an embodiment of the present disclosure.

If user device determines that its orientation is not a match with beacon device, then user device may continue to function in a normal mode. If user device determines that its orientation is a match with beacon device (e.g., its direction orientation and/or position orientation are aligned with beacon device's location), then user device may proceed as described in FIG. 8.

Continuing from FIG. 7, at step 810, user device may request and create a connection with beacon device. As described in the present disclosure, user device may create a connection with beacon device using a short-range wireless technology, for example Bluetooth or Wi-Fi. In other embodiments, user device may create a connection with beacon device through cellular technology, and in still other embodiments user device may create a connection with a server located over a network such as the Internet, where the server is in communication with beacon device. Where user device and beacon device are in communication with a server over a network, beacon device may make any images or video captured via a camera system available to the server, such that server may distribute the media content to one or more devices, such as user device.

At step 820, after a connection has been established between beacon device and user device, user device may request access to a stream of images or video captured by beacon device. Beacon device may respond by sending a stream to user device.

At step 830, user device creates a new user interface element to be displayed on the display of user device. The new user interface element may be created by an application running on user device, or alternatively may be created by operating or system software, or a combination of both. User device may use a default setting for the resolution of the new user interface element. In some embodiments, user device includes logic for determining the resolution of the display, and based on its resolution, creating the new user interface element to be a certain size. In other embodiments, a user may create user settings for creating a new user interface element, including a size or resolution of such an element to be displayed.

Once a new user interface element has been created, at step 840 user device may cause the new user interface element to display the stream of images or video sent from beacon device.

Figure 9:
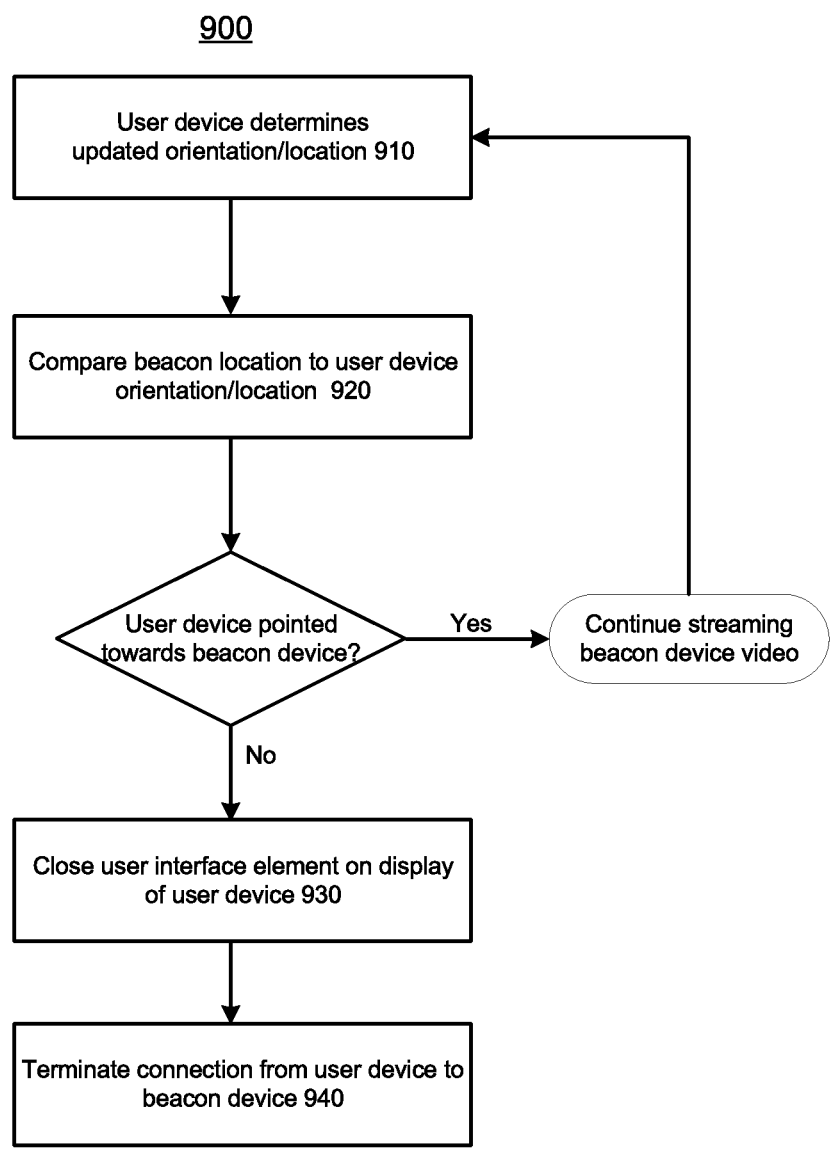
FIG. 9 shows a method for communications between a user device and a beacon device for presenting video in augmented reality according to an embodiment of the present disclosure.

Referring to FIG. 9, FIG. 9 shows a method for determining whether a user device is pointed or directed towards a beacon device, and if not, terminating a stream of images or video captured by beacon device. Beginning with step 910, user device determines updated orientation information, including an updated direction orientation and/or an updated position orientation.

At step 920, user device compares its direction orientation and/or position orientation to the beacon device location. If the user device determines that its direction orientation and/or position orientation are a match with beacon device, then it will continue to access a stream of images or video captured by beacon device and display the stream on a user interface element, for example a window.

If the user device determines that its direction orientation and/or position orientation are not a match with beacon device (e.g., if the user device is pointed in a different direction, for example if a user holding a smartphone turns a different direction, or if a user wearing a pair of smart glasses turns their head in a different direction), then at step 930, user device will close user interface element including the stream of images or video captured by beacon device, such that the user may no longer see the previously displayed user interface. For example, if a user is using a user device such as a smartphone, the user may see what is shown in FIG. 3. In FIG. 3, the user device (a smartphone) is pointed towards a wall painting and a safe, neither of which are associated with a beacon device, and thus no overlay user interface (as shown in FIG. 4) displays.

At step 940, user device terminates its connection with beacon device. In some embodiments, user device may terminate its connection with a server, when for example server transmits the stream of images or video captured by beacon device. In other embodiments, user device may keep the connection with beacon device open until user device is no longer in range of beacon device (or user device determines that its connection with beacon device is weak). At that time, user device may then terminate the connection with beacon device.

While various embodiments have been described above, it should be understood that they have been presented by way of example and not limitation. Changes in form and detail can be made to any of the disclosed embodiments without departing from the spirit and scope of such embodiments. For example, other steps may be provided or steps may be eliminated from the described flows, other components may be added to or removed from the described systems, and other instructions may be added to or removed from the described devices. Accordingly, other implementations are within the scope of the following claims.

In addition, it should be understood that any figures which highlight the functionality and advantages are presented for exemplary purposes only. The disclosed methods and systems are each sufficiently flexible and configurable such that they may be utilized in ways other than shown.

What is claimed is:

1. A method for displaying video on a user device comprising:
    detecting a beacon, the beacon in proximity with the user device, the beacon associated with a camera;
    detecting a first orientation of the user device by one or more first motion accelerometers, the first orientation indicating a direction of the user device;
    detecting a second orientation of the user device by one or more second motion accelerometers, the second orientation indicating a position of the user device;
    receiving beacon location information, the beacon location information indicating a location of the beacon;
    comparing the first orientation and the second orientation to the beacon location information;
    based on the comparing the first orientation and the second orientation to the beacon location information, requesting, by the user device, video captured by the camera;
    receiving, by the user device, the video captured by the camera;
    displaying a first window on a display of the user device, the first window comprising video captured by the user device;
    displaying a second window on the display of the user device, the second window comprising the video captured by the camera;
    detecting a third orientation of the user device by the one or more first motion accelerometers, the third orientation indicating a new direction of the user device;
    detecting a fourth orientation of the user device by the one or more second motion accelerometers, the fourth orientation indicating a new position of the user device;
    comparing the third orientation and the fourth orientation to the beacon location information;
    based on the comparing the third orientation and the fourth orientation to the beacon location information, closing the displayed second window.

2. The method of claim 1, wherein the comparing the first orientation and the second orientation to the beacon location information further comprises:
    comparing the first orientation to the beacon location information;
    determining the first orientation matches the beacon location information;
    comparing the second orientation to the beacon location information; and
    determining the second orientation matches the beacon location information.

3. The method of claim 1, wherein the comparing the third orientation and the fourth orientation to the beacon location information further comprises:
    comparing the third orientation to the beacon location information;
    determining the third orientation does not match with beacon location information;
    comparing the fourth orientation to the beacon location information; and
    determining the fourth orientation matches the beacon location information.

4. The method of claim 1, wherein comparing the first orientation and the second orientation to the beacon location information further comprises comparing the first orientation, the second orientation, and a GPS location of the user device to the beacon location information.

5. The method of claim 1, further comprising determining GPS location of the user device.

6. The method of claim 5, wherein comparing the first orientation and the second orientation to the beacon location information further comprises comparing the first orientation, the second orientation, and the GPS location of the user device to the beacon location information, and wherein requesting the video captured by the camera is based on comparing the first orientation, the second orientation, and the GPS location to the beacon location information.

7. The method of claim 5, further comprising determining an updated GPS location of the user device.

8. The method of claim 7, wherein comparing the third orientation and the fourth orientation to the beacon location information further comprises comparing the first orientation, the second orientation, and the updated GPS location of the user device to the beacon location information, and wherein terminating the video captured by the camera is based on comparing the third orientation, the fourth orientation, and the updated GPS location to the beacon location information.

9. The method of claim 1, wherein the second window is overlaid on the first window.

10. The method of claim 1, wherein the request for video captured by the camera is received by the beacon.

11. The method of claim 1, wherein the second window further comprises a text overlay, the text overlay overlaid on the second window.

12. A user device configured to display video, the user device comprising:
   a processor;
   a display in communication with the processor;
   a first motion accelerometer in communication with the processor;
   a second motion accelerometer in communication with the processor;
   a wireless transceiver in communication with the processor; and
   a non-transitory memory storing instructions that, when executed by the processor, cause the processor to perform processing comprising:
      detect a beacon, the beacon in proximity with the user device;
      receive direction information from the first motion accelerometer;
      receive position information from the second motion accelerometer
      detect a first orientation of the user device, the first orientation indicating a direction of the user device;
      detect a second orientation of the user device, the second orientation indicating a position of the user device;
      receive beacon location information, the beacon location information indicating a beacon location;
      compare the first orientation and the second orientation to the beacon location information;
      based on the comparison of the first orientation and the second orientation to the beacon location information, create a connection to the beacon;
      receive video from the beacon;
      display a first window on a display of the user device, the first window comprising video received from the user device;
      display a second window on the display of the user device, the second window comprising video received from the beacon,
      detect a third orientation of the user device by the first motion accelerometer, the third orientation indicating a new direction of the user device;
      detect a fourth orientation of the user device by the second motion accelerometer, the fourth orientation indicating a new position of the user device;
      compare the third orientation and the fourth orientation to the beacon location information; and
      based on the comparison of the third orientation and the fourth orientation to the beacon location information, close the displayed second window,
      wherein the second window is smaller than the first window.

13. The user device of claim 12, wherein the instructions further cause the processor to perform processing comprising:
   based on comparing the first orientation to the beacon location information, determine the first orientation matches the beacon location information; and
   based on comparing the second orientation to the beacon location information, determine the second orientation matches the beacon location information.

14. The user device of claim 12, wherein the instructions further cause the processor to perform processing comprising:
   based on comparing the third orientation to the beacon location information, determine the third orientation does not match the beacon location information;
   comparing the fourth orientation to the beacon location information; and
   based on comparing the fourth orientation to the beacon location information, determine the fourth orientation matches the beacon location information.

15. The user device of claim 12, wherein the instructions further cause the processor to perform processing comprising determine a GPS location of the user device.

16. The user device of claim 15, wherein the instructions further cause the processor to perform processing comprising compare the GPS location to the beacon location information, wherein creating the connection to the beacon is based on comparing the GPS location to the beacon location information.

17. The user device of claim 12, wherein the instructions further cause the processor to perform processing comprising determine an updated GPS location of the user device.

18. The user device of claim 17, wherein the instructions further cause the processor to perform processing comprising compare the updated GPS location to the beacon location information, wherein closing the displayed second window is based on comparing the updated GPS location to the beacon location information.

19. A method for displaying video on a user device placed on a user's head comprising:
   detecting a beacon, the beacon in proximity with the user device, the beacon further associated with a camera;
   detecting, by a sensor, the presence of the user's head in proximity to the user device;
   detecting an orientation of the user device by one or more motion accelerometers, the orientation indicating a first direction of the user device;
   receiving beacon location information, the beacon location information indicating a beacon location;
   comparing the orientation to the beacon location information;
   detecting an updated orientation of the user device by the one or more motion accelerometers, the updated orientation indicating second direction of the user device;
   comparing the updated orientation to the beacon location information;
   based on comparing the updated orientation to the beacon location information, creating a connection to the beacon;
   requesting, by the user device, video from the camera, the video captured by the camera;
   receiving the video captured by the camera; and
   displaying the video captured by the camera in a displayed window on a display of the user device;
   detecting, by the user device, a user gesture comprising a zoom-in gesture;

based on identifying the user gesture, changing the video displayed in the window to zoom-in;

detecting a second updated orientation of the user device by the one or more motion accelerometers, the second updated orientation indicating a third direction of the user device;

comparing the second updated orientation to the beacon location information;

based on comparing the second updated orientation to the beacon location information, closing the window on the display of the user device.

20. The method of claim 19, further comprising:

based on comparing the orientation to the beacon location information, determining the orientation does not match the beacon location information; and based on comparing the updated orientation to the beacon location information, determining the updated orientation matches the beacon location information.

\* \* \* \* \*